United States Patent [19]

Yow, Sr.

[11] Patent Number: 4,778,491
[45] Date of Patent: Oct. 18, 1988

[54] CONTINUOUSLY OPERATED AND CLEANED FILTER APPARATUS

[75] Inventor: Randall L. Yow, Sr., Greensboro, N.C.

[73] Assignee: Industrial Air, Inc., Greensboro, N.C.

[21] Appl. No.: 33,652

[22] Filed: Apr. 3, 1987

[51] Int. Cl.$^4$ .................. B01D 33/22; B01D 35/12
[52] U.S. Cl. .......................... 55/96; 55/283; 55/303; 55/307
[58] Field of Search ............... 55/96, 282, 283, 302, 55/303, 307, 310

[56] References Cited

U.S. PATENT DOCUMENTS

| | | | |
|---|---|---|---|
| 1,729,527 | 9/1929 | Titgen | 55/303 |
| 3,164,455 | 1/1965 | Westlin | 55/302 X |
| 3,486,309 | 12/1969 | Wild | 55/302 X |
| 3,612,616 | 10/1971 | Stewart | 55/302 X |
| 3,699,747 | 10/1972 | Kroll | 55/302 X |
| 3,762,143 | 10/1973 | Stewart | 55/283 X |
| 3,951,623 | 4/1976 | Furstenberg | 55/302 X |
| 4,036,614 | 7/1977 | DeMarco | 55/310 |
| 4,372,713 | 2/1983 | Kean, Jr. | 55/303 X |
| 4,502,874 | 3/1985 | Levie et al. | 55/283 |
| 4,560,396 | 12/1985 | O'Dell | 55/302 X |

FOREIGN PATENT DOCUMENTS

| | | | |
|---|---|---|---|
| 2829683 | 1/1980 | Fed. Rep. of Germany | 55/302 |
| 3324372 | 1/1984 | Fed. Rep. of Germany | 55/283 |
| 546878 | 8/1942 | United Kingdom | 55/302 |
| 778537 | 7/1957 | United Kingdom | 55/282 |

Primary Examiner—Robert Spitzer
Attorney, Agent, or Firm—C. Robert Rhodes; Judith E. Garmon

[57] ABSTRACT

Dirty air contaminated with cotton dust or the like is alternately directed against the left-hand section of a filter screen, then the right-hand section by a pair of movable baffle plates or vanes. While the dirty air impinges upon one section of the filter screen, backwash air is blown in the reverse direction through the opposite section of the other section to flush the impurities there collected. Upon receipt of a pressure differential generated signal that the one side is loaded, the baffle plates or vanes are moved to the opposite position whereby the one section of the filter screen is cleaned by the backwash air while the dirty air impinges upon the opposite side section. The interior of the filter apparatus is so constructed that the backwash air, after passing through the filter screen in the reverse direction circulates back beneath the vanes and exits in the forward direction through the screen with the clean air.

14 Claims, 2 Drawing Sheets

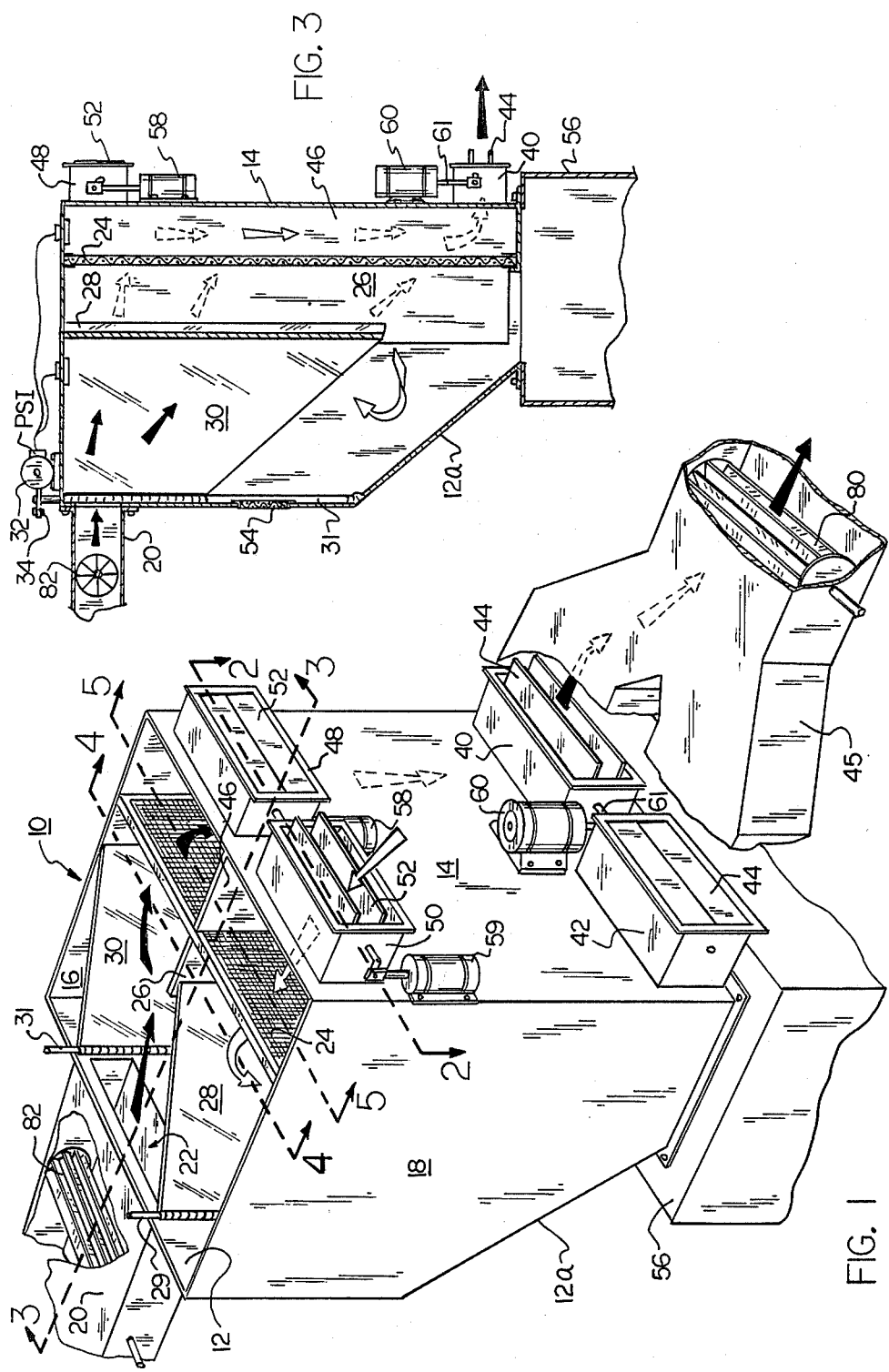

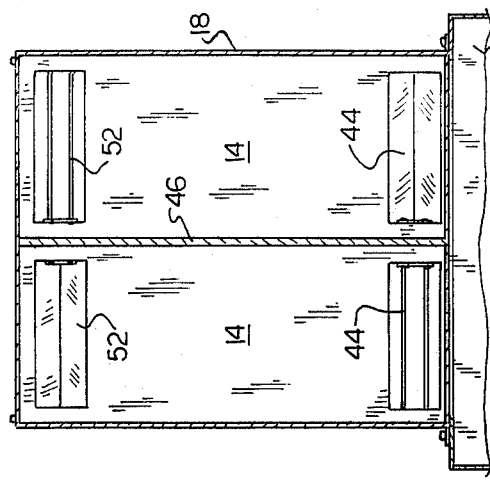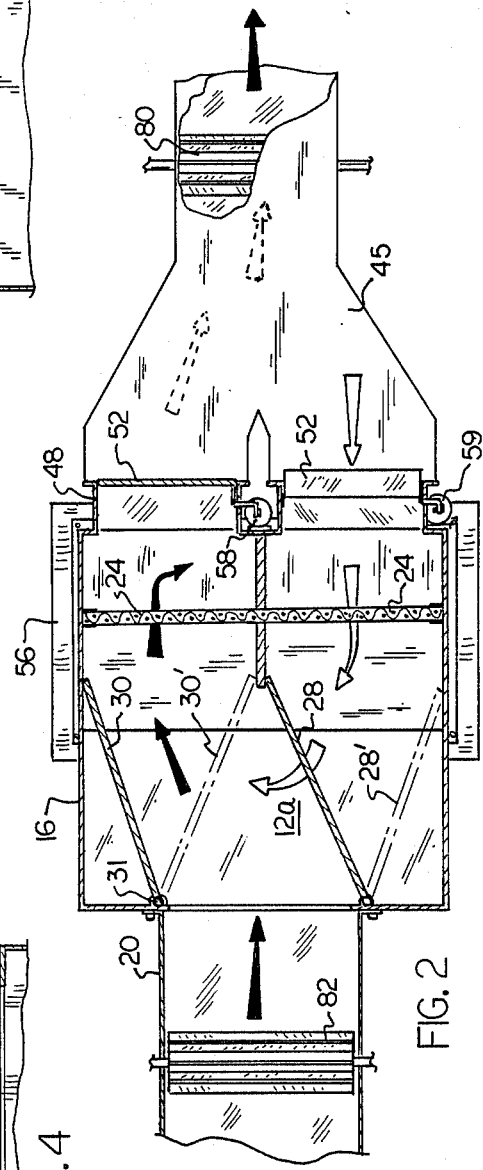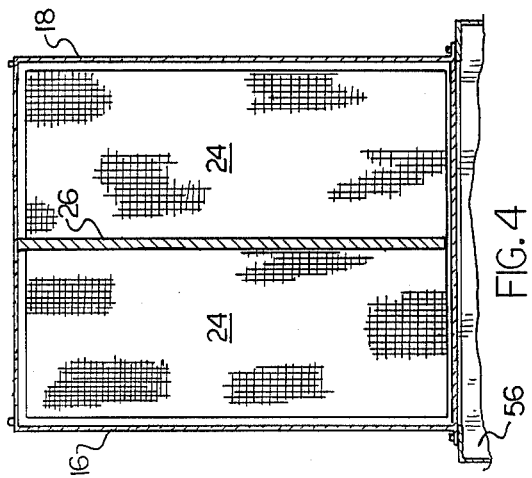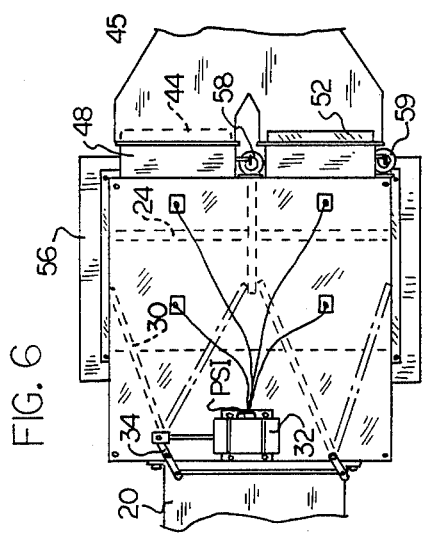

CONTINUOUSLY OPERATED AND CLEANED FILTER APPARATUS

BACKGROUND AND SUMMARY OF THE PRESENT INVENTION

The present invention is directed to air filters and more specifically to continuously operating air filters which are utilized to filter the particulate impurities from extremely contaminated air streams, and which are so constructed as to be continuously cleaned.

Most modern industrial environments require conditioning of the air space therein from the standpoint of several characteristics. Temperature must be controlled; humidity must be controlled; and the percentage of contaminants in the air must be controlled. Various reasons exist behind these conditioning requirements. Often the manufacturing or industrial operations being carried on in the work place dictate a certain temperature, humidity, or maximum level of contaminants in the air. Health and safety regulations now required that the environment in which workers perform their tasks must be free of unhealthy contaminants.

One specific example of an industrial application in which recent health and safety standards have required a reduction in the level of airborne particulates is in the processing of cotton. For decades cotton mills in which raw cotton is opened, combed, carded, and spun into yarn have been one of the most contaminated, unhealthy environments in which an industrial worker could possibly exist. Numerous cases of brown lung trace their causes to the cotton mill. Other industrial environments are similarly required to be cleaned in accordance with contemporary health and safety standards.

Some environments, such as the cotton mill, create such a contaminant laden atmosphere that continuous filtering of the air is required. It is not satisfactory to filter the return air most of the time, then to shut the system down periodically for cleaning or replacement of filters. The filtering operation must be continuous. Further, any filter media utilized in such environments loads so quickly that cleaning of the filter must be substantially continuous also. It is this type of environment with which the present invention is directed.

Continuously cleaned filters of the type in which a filter or filters are continuously cleaned by some type of movable nozzle or air plenum are known and illustrated to some extent by U.S. Pat. No. 3,951,627 to Barr, Jr. et al. Such systems are relatively expensive and the system shown by Barr utilizes a system of filter bags which are periodically cleaned by backwash air, rather than a screen.

The U.S. Pat. No. 4,372,713 to Kean, Jr. is another example of the utilization of backwash air to clean bag-type filter apparatuses. The U.S. Pat. Nos. 1,493,110 to Deihl and 1,729,527 to Titgen are examples of systems in which two, substantially duplicate filter systems are alternatively used, one providing a cleaning function while the other is being cleaned. In such systems, the air paths and filter functions are generally separated and duplicated. Thus, such types of systems are relatively expensive.

In the present invention, however, a unitary housing and single, surface loading screen-type filter element are utilized in conjunction with a pair of movable vanes which alternately direct the air to one side section of the screen, then the other. As the dirty air is directed to one side of the screen the opposite side section thereof is isolated therefrom and provided with a backwash of air pulled through the opposite side of the screen to remove the impurities there collected. The backwash air, after serving its impurity flushing function, recirculates beneath the vanes and flows out through the system in a forward direction with the clean air.

Looking more closely at the invention there is provided a method and apparatus for continuously separating particulate impurities, such as cotton dust and small fibers, from an air stream while cleaning the separating media. For this purpose there is provided a filter housing having an air permeable filter screen intermediate the front and rear wall thereof forming a front intake chamber and a rear discharge chamber. A pair of air impermeable vanes pivotally mounted on opposite sides of a dirty air inlet in the front wall of the housing are swingable or movable between a first position where the vanes form a first conduit directing the dirty air toward the left-hand side of the filter member, and a second position where the vanes form a second conduit directing the dirty air toward the right-hand side of the filter member.

With the vanes in the first position backwash air is introduced through an inlet in the upper portion of the right-hand side of the rear wall, through the right-hand portion of the screen, beneath the vanes, and back out through the left-hand portion of the screen. The vanes are then switched to the second position so that the right-hand side of the filter screen serves to clean the dirty air, while the left-hand side is flushed clean of the impurities collected thereon.

A backwash air inlet is provided in confronting relationship with each side of the filter screen in the upper portion of the rear wall while discharge outlets corresponding to each side of the filter screen are provided in the lower portion of the rear wall. Dampers associated with each inlet and outlet operate in timed relation with the movement of the vanes to open the appropriate backwash air inlet at a prescribed time while the other remains closed and to control the opening of the clear air discharge outlets at the prescribed time in relation to vane movement.

A particle collection receptacle is positioned below the intake chamber to receive contaminants flushed therefrom by the backwash air flow path. Control motors are connected to the vanes, backwash dampers, and discharge outlet dampers and are so electrically controlled that upon movement of the vanes to one side of the filter screen, and in a prescribed time sequence, the appropriate outlet and backwash damper open while the other outlet damper and backwash damper close.

It is therefore an object of the present invention to provide an improved and simplified filter apparatus and method for continuous, uninterrupted operation in the cleaning of extremely dirty air paths.

It is another object of the invention to provide a filter method and apparatus of the type described in which the incoming dirty air is first directed toward one section of a screen while the opposite section is cleaned, then directed toward the opposite side of the screen while the first side section is cleaned.

It is yet another object of the present invention to provide a method and apparatus of the type described in which the filter operation is carried on in a single enclosure.

Other objects and a fuller understanding of the invention will become apparent from reading the following detailed description of a preferred embodiment along with the accompanying drawings in which:

FIG. 1 is a perspective view of the apparatus according to the present invention with the top removed for illustrative purposes;

FIG. 2 is a sectional view taken substantially along lines 2—2 in FIG. 1, showing a sectional plan view of the filter housing;

FIG. 3 is a sectional view taken vertically through the housing;

FIG. 4 is a sectional view taken substantially along lines 4—4 in FIG. 3;

FIG. 5 is a sectional view taken substantially along lines 5—5 in FIG. 3; and

FIG. 6 is a plan view of the filter housing illustrated in FIGS. 1-5.

DETAILED DESCRIPTION OF A PREFERRED EMBODIMENT

Turning now to the drawings, in FIG. 1 there is illustrated a preferred embodiment of the invention. An air treatment housing 10 receives return air from a delivery conduit 20 and discharges air through a discharge conduit 45 back into the plant air system. The housing 10 includes a front wall 12 having a rearwardly sloping lower portion 12a, a rear wall 14, a pair of side walls 16,18, and a top wall which has been removed in FIG. 1 for the sake of illustration. The front wall includes a return air inlet 22 through which dirty air from conduit 20 passes into the interior of plenum housing 10.

A filter screen 24 extends between side walls 16,18 and substantially from the top wall to a point contiguous with the lower edges of side walls 16,18 to divide the housing 10 into an intake chamber and a discharge chamber. A vertically extending, air impermeable divider plate 26 extends forwardly into the intake chamber from screen 24 along a juncture line approximately equidistant between the side walls 16,18 to divide the filter screen into a left-hand and right-hand section.

A pair of vertically extending, air impermeable vanes 28,30 are pivotally mounted to front wall 12 by a pair of pivot pins or hinged connnections 29,31 extending along opposite sides of the dirty air inlet 22. Vanes 28,30 are of suffcient length to engage the divider plate 26 when swung to the middle position to form the first or second conduits. The vanes 28,30, however, are of a vertical dimension less than the corresponding vertical dimension of side walls 16,18, front wall 12, and rear wall 14 for reasons to be described hereinafter. A pneumatic motor 32 (FIGS. 3 and 6) is mounted on the top wall 15 of housing 10 and connected to vanes 28,30 by a linkage 34 so as to swing vanes 28,30 between a first position where the vane 28 engages the divider plate 26 and vane 30 engages the left side wall 16 to direct the dirty air toward the left-hand filter section and a second position where the vane 30 engages the divider plate 26 and vane 28 engages the right-hand side wall 18 to direct the dirty air toward the right-hand filter section (dotted lines 28',30' in FIG. 2). A pressure relief filter 54 is placed in the lower portion of front wall 12 to relieve excessive pressures inside the intake chamber.

The rear wall 14 includes upper left- and right- hand backwash air inlets 48,50 respectively. Dampers 52 selectively close backwash inlets 48,50 and are connected to pneumatic backwash motors 58,59 by means of operating levers. The timing is preferably such that when the vanes 28,30 move to the illustrated left-hand position, motor 58 immediately closes dampers 52 of left-hand inlet 48. Either simultaneously or at some time later motor 59 opens the dampers 52 of inlet 50 to admit backwash air. When the vanes reverse, the dampers to inlets 48,50 also assume the reverse position.

The lower portion of the rear wall 14 includes a left- and right-hand clean air discharge outlet 40,42 respectively. Outlets 40,42 also are selectively closed and opened by dampers 44 preferably connected to and operated by a single pneumatic damper motor 60 through a coupling linkage 61.

Clean air exits from plenum 10 through discharge outlets 40, 42 into a conduit 45 and back into the plan environment. A first suction fan 80 is so arranged as to pull air from the interior of the air treatment housing or plenum 10 at volumes of preferably 3500-4000 c.f.m. A second blower or fan 82 is positioned in the air delivery conduit 20 upstream of front wall 12, which pushes air into the housing 10 at rates of approximately 2500-300 c.f.m.

Sloped lower edge 12a (FIG. 3) extends downwardly from the lower edges of front wall 12 to guide waste particles, removed from screen 24 by the backwash air currents, through the open bottom of housing 10. The waste particles may be collected beneath housing in some type of baler 56; they may be transferred to another location by some type of screw or worm conveyor; or other disposition thereof may be made.

To provide an idea of relative size of the preferred embodiment while recognizing that such size dimensions are by way of illustration only, the housing or plenum is approximately seventy inches high (excluding hopper 54), fifty-eight inches from front to rear, and sixty inches wide. The vanes are approximately fifty-two inches in height leaving a space of approximately eighteen inches therebeneath for the passage of backwash air currents to return through the screen in a forward direction. This eighteen inch space allows the circulation of backwash air without creating disturbing air currents in hopper 54. The dirty air inlet 22 in front wall 12 is six inches by twenty-eight inches and located approximately centrally from side to side and in the upper portion of the front wall 12. Each of the backwash inlets and clean air discharge outlets are preferable twelve inches by twenty-four inches. Screen 24 is preferably seventy mesh (seventy openings per inch vertically and horizontally). As stated hereinabove the suction fan 80 draws approximately 3500-4000 c.f.m. from within the housing 10 and the return air system, schematically represented by blower 82, delivers approximately 2500-3000 c.f.m. into the housing 10 through front wall 12.

In operation, as shown in FIGS. 1 and 2 the apparatus is arranged to deliver dirty air to the left-hand portion of screen 24. Thus the left-hand clean air discharge outlet 40 is open while right-hand discharge outlet 42 is closed. In order to backwash the right-hand side of screen 24 the dampers 52 leading to the right-hand backwash air inlet 50 either simultaneously or sometime later in the cycle open while the dampers 52 leading to the left-hand backwash air inlet 48 are closed. Fan 80 produces a vacuum volume of 3500-4000 c.f.m. from within the housing and blower 82 will be delivering 2500-3000 c.f.m. of replacement air into the housing 10 and on through the left-hand portion of screen 24. A backwash air flow of 1000 c.f.m. is thus induced through inlet 50 and is drawn through the back side of screen 24 in a reverse direction thus tending to blow or flush the trapped particles collected on the dirty or front side thereof. The particles drop into collector receptacle 56 while the backwash air flow path continues down beneath vane 28 back through the left-hand portion of screen 24 and out through the discharge opening 40 along with the other clean air.

When the pressure sensitive switch PS1, which includes a first pressure sensor in the discharge chamber and a second pressure sensor in the intake chamber to measure pressure drop across screen 24, indicates a prescribed buildup of contaminating particles on the dirty side side of screen 24, vane motor 32 will be activated to move the vanes 28,30 to the second position directing the air to the right-hand section of screen 24. Either simultaneously with or after a prescribed time lapse, dampers 52 will reverse to open inlet 48 and close inlet 50. Also, motor 60 will be activated to reverse the dampers 44 causing the discharge outlet 42 to be open while discharge outlet 40 is closed. The filter operation is continued until the right-hand filter screen section becomes clogged to the prescribed level, whereupon the vanes and dampers are again reversed.

While a preferred embodiment of the invention has been described in detail hereinabove, it is obvious that various changes and modifications might be made without departing from the scope of the invention which is set forth in the accompanying claims.

What is claimed is:

1. Method for continuously separating contaminating particles from an air stream while the separating means is continuously being cleaned comprising the steps of:
   (a) generating a first, forwardly directed, generally horizontal, relatively high velocity air flow path containing particulate impurities entrained therein toward a substantially planar unitary filter screen;
   (b) diverting said first air flow path alternately through left- and right- hand sections of said filter screen;
   (c) simultaneously directing a second, relatively low velocity, flushing air flow path in a reverse direction through the one of said left- and right-hand sections of said screen opposite that through which said first air flow path is forwardly moving to blow previously deposited particles therefrom; and
   (d) allowing the larger particles blown from said screen in step (c) to fall by gravity into a collection receptable, while said second air flow path joins with and is merged into said first, forwardly directed air flow path to then pass through the opposite section of said screen in said forward direction.

2. The method according to claim 1 wherein step (c) occurs in timed relation to the diverting of said first air flow path.

3. The method according to claim 1 wherein step (a) includes pushing the air flow path from a point upstream of said filter screen toward said filter screen and simultaneously pulling the air flow path from a point downstream of said filter screen thereby tending to prevent pressure buildup inside said plenum.

4. Apparatus for continuously separating contaminating particles from an air stream comprising:
   (a) a filter plenum having a front wall with a dirty air inlet therein and a rear wall, a pair of opposed side walls, a top wall, and an open bottom defined by the lower edges of said front, rear, and side walls;
   (b) an air permeable filter screen intermediate said front wall and rear wall extending between said side walls from said top wall downwardly to a point substantially coextensive with the lower edges of said front, rear, and side walls dividing said plenum into a front intake chamber and a rear discharge chamber, and a vertically extending, air impermeable divider plate extending forwardly into said intake chamber from an imaginary line defining the vertical mid-point of said filter screen and dividing said screen into a left- and right-hand filter section;
   (c) a pair of air impermeable vanes pivotally mounted to the inside of said front wall on opposite sides of said dirty air inlet front wall and swingable between a first position where the vanes engage the divider plate and the left side wall forming a first conduit for directing the dirty air toward the left-hand filter section and a second position where the vanes engage the divider plate and right side wall forming a second conduit for directing the dirty air toward the right-hand filter section;
   (d) an upper left- and right-hand backwash inlet in said rear wall, and dampers associated with each of said backwash air inlets for selectively opening and closing said inlets;
   (e) a lower left- and right-hand, clean air discharge outlet in the lower portion of said rear wall and dampers associated therewith for selectively opening and closing said discharge inlets;
   (f) a vertical air impermeable partition extending vertically between said rear wall and said filter screen for separating said discharge chamber into a left-hand portion for directing air between the left-hand screen section and said upper left-hand backwash air inlet and said lower left-hand clean air outlet and a right-hand portion for directing air between the right-hand screen section and said upper right-hand backwash air inlet and said lower right-hand clean air outlet;
   (g) a particle receptacle positioned beneath said open bottom for collecting contaminants falling from the dirty side of said screen;
   (h) control motors connected to said vanes, said backwash dampers and said discharge outlet dampers, said control motor being so controlled that, responsive to movement of the vanes to direct air to one section of said filter screen, the corresponding outlet damper and opposite backwash damper open and the opposite outlet damper and corresponding backwash damper close; and
   (i) fan means for causing a forwardly flow of air into said filter plenum through said dirty air inlet between the vanes and through the operative section of said screen and, out of said plenum through the open discharge outlet; said fan means causing a reverse flow of air into said plenum through the open backwash inlet and through the inoperative section of said screen in the reverse direction.

5. The apparatus according to claim 4 wherein the lower edges of said vanes define a plane spaced above the lower extremity of said housing, whereby backwash air currents, after passing through said filter screen in the reverse direction, pass beneath said vanes and are picked up in the air stream passing through said filter screen.

6. The apparatus according to claim 4 wherein said dirty air inlet is positioned in said front wall adjacent the upper edge thereof, whereby the contaminants will tend to follow a path forwardly and downwardly toward the filter screen being deposited substantially evenly thereon.

7. The apparatus according to claim 4 wherein said fan means comprises a suction fan operatively arranged downstream from said discharge outlets and a blower fan operatively arranged upstream of said dirty air inlets, said suction fan being capable of moving a greater volume of air than said blower fan whereby air is pulled into said plenum through said backwash outlets.

8. Apparatus for continuously separating contaminating particles from an air stream while the separating apparatus is continuously being cleaned comprising:
   (a) means for generating a first, forwardly directed air flow path containing particulate impurities therein;
   (b) a filter plenum having a front wall with a dirty air inlet therein and a rear wall, a pair of opposed side walls, a top wall, and an open bottom defined by the lower edges of said front, rear, and side walls; a substantially planar, air impermeable filter screen intermediate said front wall and rear wall extending between said side walls from said top wall downwardly to a point below said dirty air inlet, said filter screen dividing said plenum into a front intake chamber and a rear discharge chamber, said screen having a left-hand and right-hand section positioned in said air flow path;
   (c) movable, air impermeable vane means comprising a pair of air impermeable vanes pivotally mounted to the inside of said front wall of said plenum on opposite sides of said dirty air inlet for directing said air flow path alternately through said left- and right-hand sections of said filter screen;
   (d) backwash means operated responsive to movement of said vane means for directing a cleansing air flow path in a reverse direction through the left- or right-hand section of said screen opposite that through which the forwardly moving first air flow path is directed.

9. The apparatus according to claim 8 wherein said means for generating said first air flow path includes a blower fan positioned upstream of said dirty air inlet for directing air currents between said vane means against the upper portion of said filter screen; a left-hand and right-hand discharge outlet on the downstream side of said filter screen, said discharge outlets being positioned in said rear wall in opposed spaced relation to the lower portion of said filter screen; a suction fan positioned downstream of and in operative communication with said discharge outlets, whereby said first air path passing through said screen is caused to flow downwardly and outwardly through the corresponding discharge outlet.

10. The apparatus according to claim 9 wherein each of said discharge outlets are provided with a damper means for selectively opening and closing thereof, and motor means for operating said damper means of each discharge outlet in opposed synchronous relation to the other.

11. The apparatus according to claim 10 wherein said means for generating said second air flow path includes a left- and right-hand air inlet on the downstream side of said filter screen, said left- and right-hand air inlets positioned in opposed spaced relation to the upper portion of said filter screen, said suction source drawing air from said left- and right-hand inlets in a reverse direction through said filter screen to dislodge contaminants thereon, said second air flow path then joining, said first air flow path and continuing through said screen in a forwardly direction through one of said discharge outlets.

12. The apparatus according to claim 11 wherein each of said left- and right-hand air inlets for the second air flow path are provided with a damper means for selectively opening and closing thereof, and motor means for operating said damper means of each air inlet in timed relation to said vane motor.

13. The apparatus according to claim 12 wherein said discharge outlet damper motor means and said backwash inlet damper motor means are activated in timed sequence responsive to activation of said vane motor means.

14. The apparatus according to claim 11 wherein said means for generating said first forwardly directed air flow path comprises a suction fan downstream of said screen and a blower fan upstream of said screen, said suction fan being capable of moving a greater volume of air than said blower fan, and said suction source comprises said suction fan.

* * * * *